United States Patent

Chichester et al.

[11] 3,978,937
[45] Sept. 7, 1976

[54] HYDROSTATIC PROPULSION SYSTEM

[75] Inventors: Willard L. Chichester; Donald A. Holtkamp, both of Battle Creek, Mich.

[73] Assignee: Clark Equipment Company, Buchanan, Mich.

[22] Filed: Sept. 23, 1974

[21] Appl. No.: 508,588

[52] U.S. Cl. .............................. 180/44 F; 60/421; 180/66 R
[51] Int. Cl.² ................... F16H 39/46; B60K 17/34
[58] Field of Search ............ 180/44 F, 44 R, 66 R, 180/6.48, 6.3; 60/421, 426, 427, 445, 486, 375, 428

[56] References Cited
UNITED STATES PATENTS

| | | | |
|---|---|---|---|
| 3,091,930 | 6/1963 | Thoma, et al. | 180/66 R |
| 3,092,970 | 6/1963 | Sampietro | 60/421 |
| 3,161,246 | 12/1964 | Meeker | 180/66 R |
| 3,422,917 | 1/1969 | Guinot | 180/66 R |
| 3,724,583 | 4/1973 | Caldwell | 180/66 R |
| 3,841,423 | 10/1974 | Holtkamp et al. | 180/6.3 |

FOREIGN PATENTS OR APPLICATIONS

| | | | |
|---|---|---|---|
| 794,408 | 5/1973 | Belgium | 180/6.3 |

Primary Examiner—M. H. Wood, Jr.
Assistant Examiner—Jack D. Rubenstein
Attorney, Agent, or Firm—John C. Wiessler

[57] ABSTRACT

A closed recirculating hydrostatic transmission system suitable for driving a traction vehicle. The system includes a pair of hydrostatic engine driven variable displacement pumps either of different displacements or engine driven at different speed ratios and each pump being operative to drive hydrostatic motors at the various wheels and in separate closed loop drive circuits such that accurate flow division as between the circuits is effected for driving the vehicle in four-wheel drive or, at the operator's selection, for driving the motors in the one closed loop circuit at a higher speed in two-wheel drive by means of the pump of larger discharge volume. An operator's control operates both pumps together within the limits of the smaller discharge pump in four-wheel drive, and operates the larger discharge pump within the limits thereof while rendering ineffective the smaller discharge pump in two-wheel drive. Valve means enables smooth transition and shifting between two and four-wheel drive at any time. Flow divider-combiner means in each closed loop circuit adjusts fluid flow to each motor as a function of steering angle to assure positive traction at each driven wheel in either forward or reverse drive under all surface conditions, and to differentiate as required wheel speeds during vehicle steering operations. Braking may be effected by reversing pump flow at selected conditions of either decreasing, constant or increasing engine speed.

30 Claims, 8 Drawing Figures

HYDROSTATIC PROPULSION SYSTEM

BACKGROUND OF THE INVENTION

This invention provides a significantly different hydrostatic system than is disclosed in our co-pending application Ser. No. 406,768, now U.S. Pat. No. 3,841,423, although it is intended to effect similar advantageous results.

Reference may be had to our above co-pending patent for a background statement of invention, plus referring to our Belgium Pat. No. 794,408, published May 16, 1973, which patent corresponds to our above co-pending U.S. patent.

SUMMARY

The present invention concerns a traction drive hydrostatic transmission system of the closed loop type in which the operator is able to shift smoothly from two to four-wheel drive or vice versa during driving of the vehicle at any vehicle speed.

A pair of independent closed loop circuits are activated by a pair of engine driven variable displacement reversible fluid pumps, one of which is capable of pumping a larger discharge volume than the other, for driving the vehicle at selected speeds and torque in forward and reverse drive, under which condition the vehicle is in four-wheel drive and control means limits the discharge volume of the one pump to the maximum discharge volume of the other pump. The control means is also operable to select two-wheel drive in which the said other pump is returned to zero displacement condition while the said one pump may operate up to its maximum available discharge volume.

It is a primary object of our invention to provide a hydrostatic transmission system capable of providing a versatile two and four-wheel drive vehicle of relative simplicity and low cost having continuous controlled traction at all driven wheels.

Other more particular objects and features of the invention will become apparent to those skilled in the art from the following description and drawings forming a part hereof.

Description of the Preferred Embodiment

Figure 1:
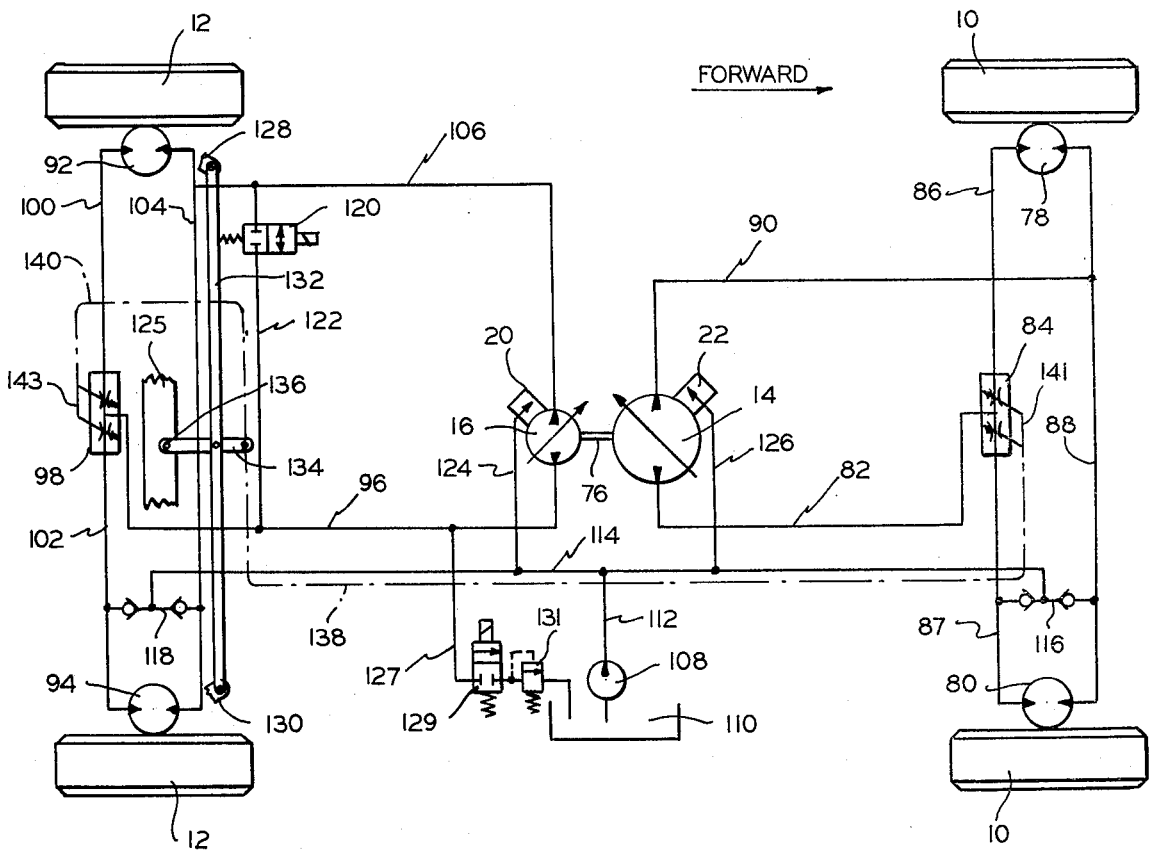
FIG. 1 is a schematic view of our hydrostatic transmission system in a vehicle.

Referring now in detail to FIGS. 1–6, a vehicle is represented by front and rear pairs of wheels 10 and 12 adapted to be driven by my hydrostatic transmission system which includes a pair of operator controlled reversible variable displacement pumps 14 and 16 of different capacities driven by an engine 18 coupled thereto, the control section of the pumps for varying the displacement via control of the camming or swash plate angles being represented at numerals 20 and 22. An accelerator pedal 24 may be connected by push-pull cables and levers 26, 28, 30 and 32 to control the engine via a carburetor 34. The pump control sections 20 and 22 are manually controlled by the operator via the controls shown in FIGS. 2–6, which comprise generally an operator's hand control 36 connected to a control element 38 of pump 16 by a push-pull cable 40 and to a pump displacement limit element 42 by a push-pull cable 44 and a rod 46 mounted for vertical guidance by a pin 48 which engages a slot 50 in a fixed guide element 52.

Figure 4:
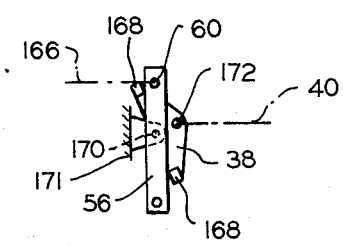
FIG. 4 is a detail view of a second operating position of a control member in the controls of FIG. 2.
Figure 5:
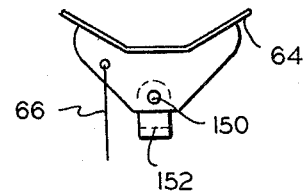
FIG. 5 is a front view of one of the operator's pump controls shown in FIG. 2.
Figure 6:
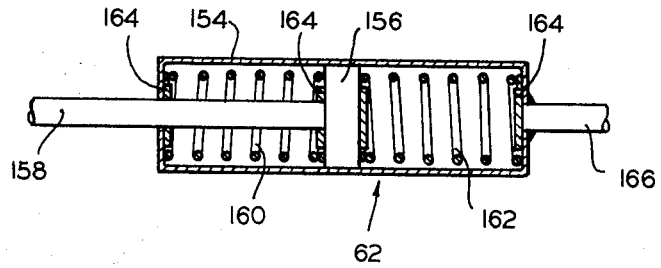
FIG. 6 is an enlarged sectional view of an actuator link element in FIG. 2.

Pump displacement via control sections 20 and 22 is effected by actuating in one direction or the other for forward or reverse vehicle drive the pump control levers 54 and 56 which are interconnected at pivot points 58 and 60 by a mechanical piston and link assembly shown generally at 62 and in detail in FIG. 6. The pump controls 54 and 56 are also connected to a forward and reverse operator's foot pedal control 64 (also see FIG. 5) by a push-pull rod, lever and link assembly 66, 68 and 70, link 70 being also connected pivotally at 58 to control lever 54. Mounted on link 70 is an element 72 which is configured in camming relationship to displacement limit element 42 and is adapted to cooperate therewith to establish limits of pump displacement during four-wheel drive vehicle operation by limiting the available travel of rod 70 to the traversable distance of element 72 between the ends of element 42, as shown, thereby to limit the maximum angular movement in both forward and reverse of pump control levers 54 and 56. In two-wheel drive, on the other hand, as will be described further below, restrictor element 42 is elevated by the operation of control lever 36 so that element 72 may be actuated in either direction beyond the then non-interfering ends of elements 42 whereby to increase the displacement of pump 14 while at the same time actuating through the linkage system which includes cable 40, the lever 56 and pump 16 to a non-pumping condition (FIG. 4).

Pumps 14 and 16 differ in displacement, and for exemplary purposes it will be assumed herein that pump 14 has a displacement twice that of pump 16, although it should be understood that any other ratio of displacement between the pumps is a matter of design choice depending upon the application of our invention. The pumps are engine driven by a single common drive shaft 76 to operate always together at the same rpm. Pump 14 is connected hydraulically in forward drive to a pair of fixed displacement front wheel motors 78 and 80 by a proportional flow divider-combiner unit 84, conduits 86 and 87 conveying pump discharge to the motors and return conduits 88 and 90 returning the fluid flowing in the closed loop circuit of pump 14 to the inlet of the pump. Operating pump 14 in reverse by means of the control system of FIG. 2 reverses the above flow route in which conduit 90 becomes the pressure discharge conduit, the fluid returning to the then pump inlet through conduit 82, in which the condition unit 84 functions as an adjustable flow combiner. Pump 16 is connected similarly hydraulically for both forward and reverse drive to a pair of fixed displacement rear wheel motors 92 and 94 by way of conduit 96, a proportional flow divider-combiner unit 98, and conduits 100, 102, 104 and 106.

Make-up fluid in the system is provided by a charging pump 108 which is connected to a reservoir 110 and to the opposite closed loop circuits connecting pairs of motors 78,80 and 92,94 by conduits 112 and 114 and low pressure one-way check valve sets 116 and 118 which connect opposite sides of the circuit loops of the pairs of wheel motors, as shown. The make-up and control circuit also communicates with pump control sections 20 and 22 by way of lines 124 and 126 in order to supply pressure fluid to a conventional servo valve and power boost piston in each pump which actuates the respective swash plates as controlled by control pump levers 54 and 56.

In addition, a solenoid actuated on-off valve 120 is adapted to communicate conduit 106 with reservoir 110 by way of conduits 122, 96 and 127 under conditions to be described. A solenoid actuated two-positions valve two-position is a part of a fluid cooling circuit located in conduit 127 which is operative under certain conditions to return a limited amount of fluid circulating through motors 92 and 94 when wheels 12 are not in traction drive to reservoir 110 by way of a pressure compensated flow control valve 131 which functions to permit a predetermined volume of fluid flow therethrough to reservoir 110 irrespective of variations in the upstream fluid pressure. As will be described further hereinbelow, valves 120 and 129 are operated simultaneously so that in four wheel traction drive both valves are closed, as shown, and in two wheel drive with wheels 12 free-wheeling both said valves are actuated open.

To improve the clarity of this description, we have not shown certain important but well-known sub-circuits herein which are not necessary to an understanding of our invention, such as pump relief valve circuits and fluid leakage circuits for connecting the wheel motors and pumps to the reservoir. Also, it will ordinarily be found desirable to provide a fluid make-up circuit connected by one-way check valves to the opposite sides of each of pumps 14 and 16 and supplied by charging pump 108 adapted to communicate with the inlet and discharge lines of each pump, respectively, depending upon forward or reverse operation thereof.

Steering of the vehicle is effected by a conventional operator power steering device for actuating dirigible wheels 12, which are mounted on a steer axle 125. Steering arms 128 and 130 are pivotally connected to a tie rod 132 which is connected pivotally at its center to a lever arm 134 pivoted on the steer axle at 136 and connected to push-pull cables represented by the broken lines 138 and 140 which are connected to controls 141 and 143 of flow divider-combiner units 84 and 98 for dividing the fluid flowing to or from the respective pairs of drive wheel motors proportional to the steer angle of wheels 12, as described further below.

Figure 2:
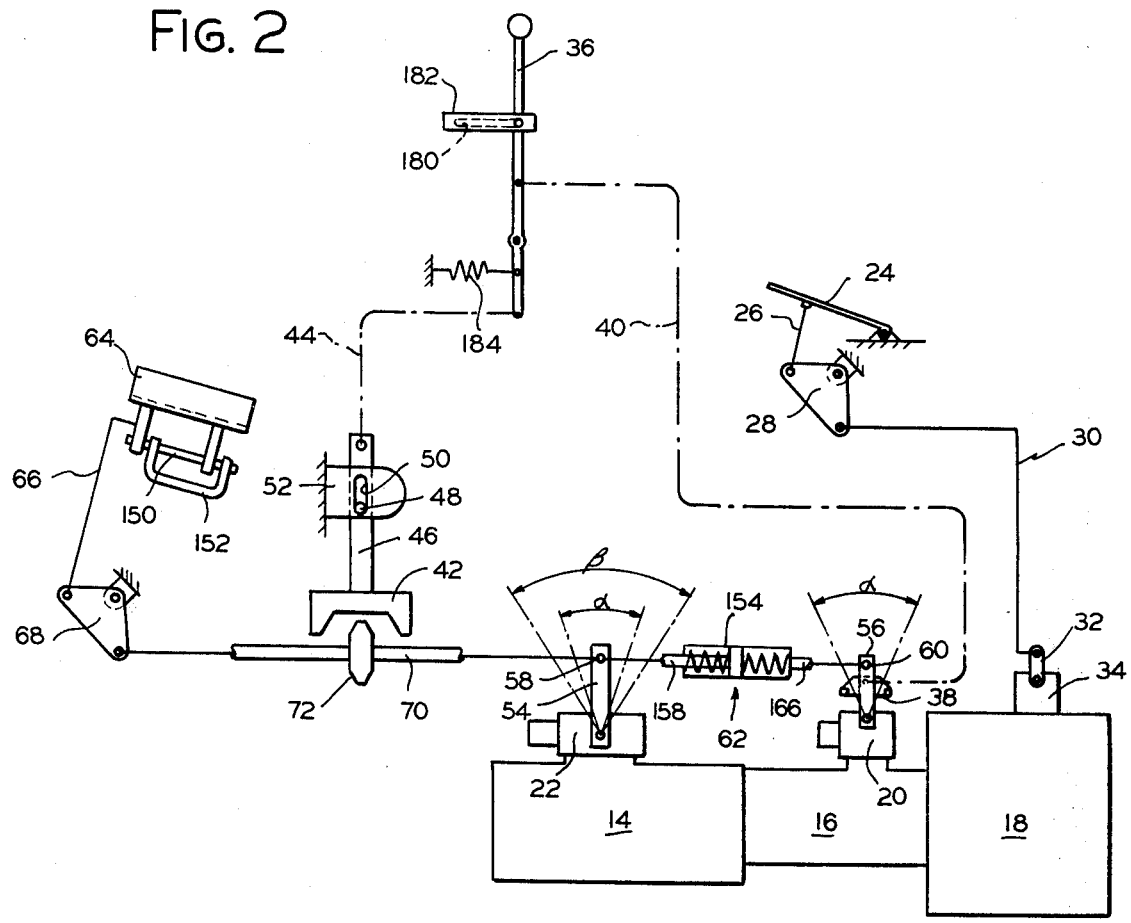
FIG. 2 is a schematic view of the controls for the transmission system of FIG. 1.

Referring now in detail to the mechanical control portion of FIG. 2, forward and reverse pedal control 64 is mounted for pivotal movement to the right or to the left from a shaft 150 in a floor mounted bracket 152 and having cable 66 connected to one side thereof as shown in FIG. 5 so that push or pull action is effected for forward or reverse drive, respectively, through the lever and linkage assembly connected to pump control levers 54 and 56. The mechanical link cylinder assembly 62 comprises a cylinder 154 in which is mounted a piston head 156 having a rod 158 pivotally connected at 58 to pump lever 54. The piston is maintained in a centered position in the cylinder when the swash plates of the pumps are at zero angle, which is the condition as illustrated in FIG. 2 by centering compression springs 160 and 162 located on opposite sides of the piston head. Spring retainers 164 are secured to opposite ends of the cylinder and to opposite sides of the piston. A control rod 66 is secured to the right end of cylinder 154 and is pivotally connected at 60 to control lever 56. A pair of stops 168 are located on opposite ends of control element 38, element 38 being connected by a pivot 170 to a fixed body member at 171 and being connected to control cable 40 at 172.

Figure 3:
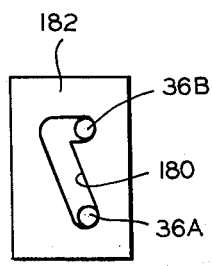
FIG. 3 is a detail plan view of an operator's control handle detent.

Operator's control lever 36 is a two-position lever which functions in one or the other of positions 36A and 36B, FIG. 3, which are located at the extremity of a control slot 180 in plate 182, lever 36 being normally held in position 36A by an extension spring 184 and actuatable against the spring to position 36B. In position 36B control element 42 is elevated relative to slot 50 of guide member 52 so that element 72 may be actuated beyond either end of element 42 while cable 40 rotates control element 38 on pivot 170 to the position illustrated in FIG. 4. In actuating element 38 to the FIG. 4 position stops 168 actuate pump control lever 56 to the zero pump displacement position shown and maintain the lever in that position irrespective of the degree of manipulation by control pedal 64 of pump lever 54 through control rod 70.

When the control is located as illustrated in FIG. 2 the limits of pump displacement of both pumps 14 and 16 are limited by the capacity of small pump 16, as represented by the angles $\alpha$ shown between the two pairs of broken lines illustrated at pump levers 54 and 56. The $\alpha$ displacement limit is controlled by the available movement of control rod 70 between the end abutments provided between control elements 42 and 72, foward vehicle drive being effected by movement of element 72 rightwardly from the zero pump displacement position illustrated, and reverse vehicle movement being effected by actuation of element 72 leftwardly of the illustrated position thereof, all as controlled by pedal 64. Actuation of control lever 36 from positions position to 36B under any existing condition of system operation between zero pump displacement and maximum pump displacement as limited by control elements 42 and 72, elevates control element 42 and actuates pump lever 56 to a zero displacement position, as above described, so that control rod 70 may then actuate pump lever 54 to effect any selected displacement of pump 14 up to the maximum capacity thereof, while pump 16 rotates at the same rpm and at zero displacement.

In thus controlling at the operator's selection the limits of displacement of the pumps when they are operating in tandem or when pump 14 is operating alone to drive the vehicle, the mechanical operation of cylinder assembly 62 is as follows: In control position 36A the cylinder assembly functions as a solid link between link rods 70 and 166 inasmuch as centering springs 160 and 162 maintain piston 156 centered and rods 70 and 158 actuate rod 166 through the cylinder 154 as a solid link connection. The pumps are thereby synchronized to operate always at the same displacement within the limits of displacement of small pump 16 and are synchronized to always operate at the same rpm by the common drive shaft 76 between the pumps. It will be understood by persons skilled in the art that it may be found desirable in some applications to operate the pumps by independent drive shafts either at the same rpm, or at different rpm's by variations in gear reductions, for example, as between the pump drives. Control position 36A is the condition of operation of the hydrostatic drive system when operating in four-wheel drive, as will be explained in greater detail below.

In operation with lever 36 in control position 36B pump lever 56 is held in a neutral position by element 38 as shown in FIG. 4 and the actuation of link rod 70 by pedal 64 actuates piston 156 in cylinder 154 to compress spring 162 in forward vehicle drive and to compress spring 160 in reverse drive within the limits of movement of the piston in the cylinder while control element 42 is elevated. Cylinder 154 is, of course, held in a fixed position by the action of control element 38 while permitting the said available control movements of the piston therein sufficient to drive pump 14 at maximum displacement, which in the exemplary embodiment, is twice the displacement of pump 16 so that the vehicle may be driven at double the speed in two-wheel drive as in four-wheel drive. The angle β illustrated between the second set of limits of movement of lever 54 denotes the limits of displacement in forward and reverse drive of pump 14. In addition, actuation of control 36 to position 36B engages a switch, not shown, which causes solenoid valves 120 and 129 to actuate open from normally closed positions in four-wheel drive for a purpose to be explained.

Figure 8:
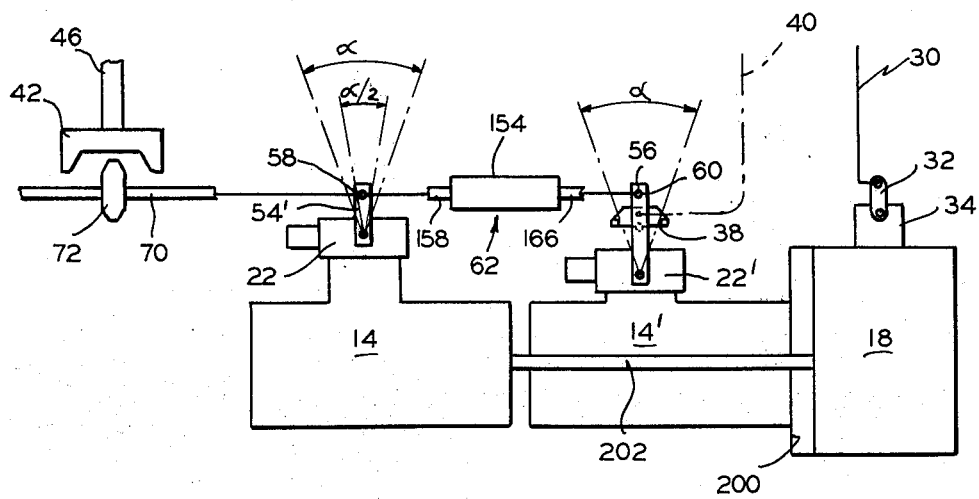
FIG. 8 is a partial view of the controls of FIG. 2 modified for the FIG. 7 embodiment.

In some of the claims hereof recitation of "first control means" and "second control means" appear, which, as related to the embodiments as shown in FIGS. 2 and 8 hereof, cover the pump control means first when the control lever 36 is in position 36A, and second when it is in position 36 B. For example, the first control mans as related means the structure of FIGS. 2 and 8 comprises control lever 36 in position 36A and elements 52, 42, 70, 72 and 62, whereas the second control means comprises lever 36 in position 36B and elements 52, 42, 70, 62, and 38.

In operation, with the system in four-wheel drive, each of pumps 14 and 16 displace the same volume of fluid at any selected operating condition within the limits of engine speed and of control rod 70 movement as imposed by control element 42 in either forward or reverse drive through the respective and independent closed loop circuits of FIG. 1. Valves 120 and 129 are, of course, closed under such conditions, and positive traction drive is assured at all four wheels regardless of variations in surface tractive conditions as between any two or more wheels.

During vehicle turning maneuvers positive traction at each wheel and correct wheel speed differentiation as a function of the steering angle of dirigible wheels 12 is effected by the operation of flow divider-combiner units 84 and 98 as controlled by lever 134. In other words, the push-pull cables 138 and 140 control units 84 and 98 to divide or combine in forward or reverse drive the correct proportion of fluid flowing as between each of the front and rear pairs of wheel motors such that correct differentiation of the rotational speeds of wheel sets 10 and 12 is realized at all steering angles, the outside wheels being driven in traction to rotate at speeds greater than the driven inside wheels in amounts always proportional to the steering angle of wheels 12. Further, the flow divider-combiner units are so designed as to maintain at either restrictor section thereof the same differential pressure causing flow through that section regardless of possible variations in pressure downstream in line 86 or 87 in the forward loop circuit and in lines 100 and 102 in the rear loop circuit at any adjusted setting of the divider-combiner units by cables 138 and 140, thus eliminating the possibility of loss of traction at any wheel for any reason. An exemplary divider-combiner unit which performs as above indicated is Model 2VXP 1420 Series manufactured by Fluid Controls, Inc., Mentor, Ohio.

During a shift from four to two-wheel drive it is highly advantageous to provide a transient condition of operation in which the output of pump 16 is by-passed back to inlet of pump 16 and to permit a limited volume to flow to the reservoir at the same time of actuation of control 36 to position 36B, at which time pump 14 may be operating at any displacement, but limited to the maximum displacement of pump 16. Since actuation to position 36B returns pump 16 to a zero displacement condition and opens valves 120 and 129 to pump 16 inlet and to the reservoir through pressure compensated flow control valve 131 it is apparent that no pressure surges or jerkiness in operation in the system can occur and that pump 14 continues to drive wheel motors 78 and 80 at the displacement existing at that moment in time as limited by control element 42. Operation during shifting from four to two-wheel drive effects the maintenance of vehicle speeds substantially the same as in four-wheel drive, but with one-half of the system fluid not being utilized. Thus, the system is conditioned for subsequent two-wheel drive at full speed by the transient condition of two-wheel drive at one-half or less maximum vehicle speed. Thus, a smooth, jerk and surge free transition is effected regardless of the engine speed, vehicle speed or pump displacement at which control 46 is actuated from position 36A to 36B. Likewise, a smooth transition from two to four-wheel drive is effected at any engine speed inasmuch as the displacement of pump 14 must be in a condition at which control element 72 may be trapped within the camming section of element 42, and therefore within the displacement range of pump 16 so that actuation of lever 36 from position 36B to 36A releases the control cylinder assembly 62 to actuate pump lever 56 to the same angular displacement as pump lever 54 which effects traction drive at all of the wheels at the same motor speed as in two wheel drive at the selected displacement at the time of lever actuation to position 36A. It will be understood that pump 16 is already operating via drive shaft 76 at existing engine speed at the time lever 56 is actuated out of centered position. The use of such operational transition in shifting between two and four-wheel drive while the vehicle is being driven at any selected speed has been found to be essential in order to control and minimize shock pressure loading in the system and jerky operation of the vehicle.

It will be noted that in two-wheel drive, valves 129 and 131 open to return a predetermined volume of fluid circulating through motors 92 and 94 to the reservoir since otherwise the fluid circulating in the closed parallel circuit during free-wheeling of wheels 12 would generate too high a temperature in the hydraulic circuit of motors 92 and 94. When the vehicle is operated in reverse drive a reverse flow in the circuit occurs with the valves 120, 129 and 131 functioning the same as in forward drive, both in four and two-wheel drive.

Full braking capability is inherent in our transmission system, rendering service brakes unnecessary. Normal deceleration of the vehicle is effected by merely releasing the accelerator pedal 24 in the usual manner; an increase in deceleration may be obtained by releasing both pedals 24 and 64 while underway in either two or four-wheeled drive. Positive braking of the vehicle may be effected by reversing one or both pumps, depending upon two or four-wheel drive, while maintaining engine speed, and under emergency conditions a "panic" stop is accomplished by reversing the pump or pumps and increasing the engine speed. On wet or icy surfaces it may be particularly desirable to shift from two to four-wheel drive during emergency stops in order to achieve the additional benefits of four-wheel traction.

Figure 7:
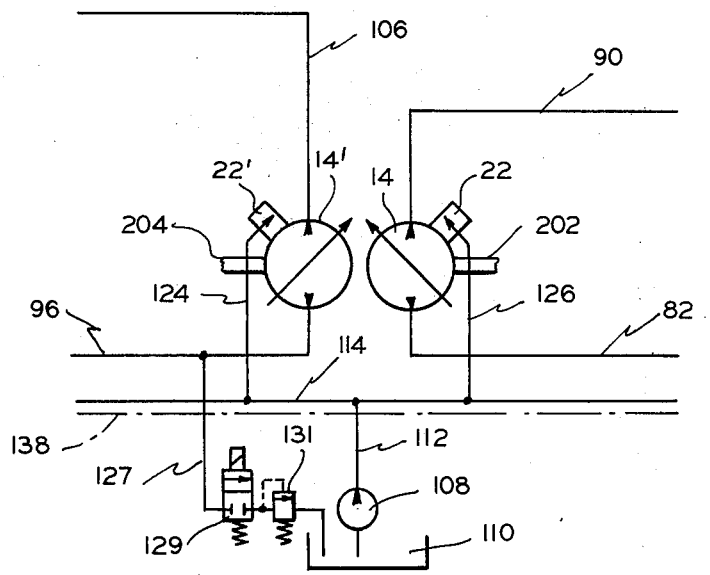
FIG. 7 is a broken away partial view of FIG. 1 showing a modified pump arrangement.

Referring now to FIGS. 7 and 8, we have illustrated a modification in which the variable displacement pumps are of equal maximum displacement, illustrated as pumps 14 and 14', with pump 14 being assumed to operate at a 2:1 speed ratio relative to pump 14' as effected through a gear reduction illustrated diagrammatically at numeral 200 on engine 18, said pumps being connected thereto by separate drive shafts 202 and 204. In this exemplary modification the effective length of pump control lever 54' is one-half the length of control lever 56', and the pump control section 22' is the same as control section 22. Other features of the embodiment illustrated in FIGS. 1–6 may be same in the embodiment of FIGS. 7 and 8, and have been numbered the same as in FIGS. 1 and 2.

Thus, it will be seen that the operational result of the modified embodiment is the same as in that of FIGS. 1–6 in the use of pumps of the same maximum displacement with the pump having the greater discharge capacity being operated at twice the rpm of the other pump and at one-half the pump displacement. As illustrated, this is effected by a 2:1 length ratio between control levers 56' and 54', the pump 14 having one-half the displacement of pump 14' at equal fluid discharge in four-wheel drive (represented by the displacement angle designations $\alpha$ and $\alpha/2$; in two-wheel drive pump 14 doubles its discharge flow at displacement angle $\alpha$ while pump 14' is returned to a zero displacement condition.

It will also be appreciated by persons skilled in the art that the convenient mechanical means for actuating pump control lever 56 in FIG. 2 and 56' in FIG. 8 to neutral position in two-wheel drive may be replaced by any feasible mechanical variation, such as substituting for element 38 and associated parts in the drive line of pump 14' a clutch in the drive line so as to return to a non-pumping condition the pump 22' by declutching the same when the system is shifted from four to two-wheel drive. The swash plate of the declutched pump 22' would be returned to a zero displacement position by conventional centering springs.

Of course, it will be understood that any desired combination of pump sizes, relative speed ratios, pump control lever length, and the like, are matters of design choice depending upon the particular application, costs, space, availability, and all other such factors as are considered by the design engineer, all such variations being well within the scope of our invention.

It will be understood that terms in the claims hereof such as "fluid discharge capability" and "pumping capacity" are related to operation of the system under any given operating condition, such as any given engine speed.

Although we have described and illustrated only two embodiments of our invention, in addition to discussing other obvious variations thereof, it will be understood by persons skilled in the art that many other modifications may be made in the structure, form and relative arrangement of parts without departing from the spirit and the scope of the invention. It is obvious, for example, that the hydrostatic drive system of the basic type herein disclosed is readily modifiable and applicable within the scope of the invention to a three-wheel vehicle wherein, for example, the third wheel may be a drive-steer wheel. U.S. Pat. No. 3,376,990 discloses a three-wheel vehicle having two front wheel drive and one rear wheel steer; the present invention has application to such a modified vehicle, as well as, of course, vehicles using any number of wheels greater than three.

Likewise, as will be apparent, the invention is applicable to endless track vehicles, drive elements of which may be of various shapes other than a wheel shape, and so equivalence between wheels and other shapes performing a similar function as wheels is intended by applicants. For example, an endless track vehicle having a generally square-shaped driving element M as shown in U.S. Pat. No. 3,531,165.

It is clear that different diameter wheels may be utilized as between first and second pairs of wheels in a given vehicle, for example, and while we have illustrated pairs of wheels 10 and 12 of equal diameter they may be of any selected different diameters, the important factor in equal traction drive as between the wheels being that the wheels traverse substantially the same circumferential distance in the same period of time irrespective of variations in surface or road traction as between surface or road engaging elements of any of said wheels, the volume distribution of hydraulic fluid to the pairs of motors being a function of the respective wheel diameters.

Accordingly, it should be understood that we intend to cover by the appended claims all such modifications which fall within the scope of our invention.

We claim:

1. In a hydrostatic drive system for a vehicle having a prime mover, first and second traction means, and first and second hydraulic motor means for driving respective ones of said traction means, first and second variable displacement hydraulic pump means driven by the prime mover means for driving respective ones of the hydraulic motor means, said first pump means having a fluid discharge capability greater than the fluid discharge capability of said second pump means, and control means limiting the fluid discharge of said first pump means substantially to the fluid discharge of said second pump means under a first vehicle operating condition.

2. A vehicle drive system as claimed in claim 1 wherein said prime mover means drives said first and second pump means at the same rpm.

3. A vehicle drive system as claimed in claim 1 wherein said prime mover means drives said first and second pump means at different rpm's.

4. A vehicle drive system as claimed in claim 2 wherein said first pump means has a displacement greater than said second pump means, and the control means limits the displacement of the first pump means substantially to the displacement of the second pump means under said first vehicle operation condition.

5. A vehicle drive system as claimed in claim 1 wherein each of said pump means operates with its respective motor means in a closed loop.

6. A vehicle drive system as claimed in claim 1 wherein the fluid discharge of said first pump means is so limited when said first and second pump means are driving said first and second motor means.

7. A vehicle drive system as claimed in claim 2 wherein a common shaft is connected to and drives said first and second pump means.

8. A vehicle drive system as claimed in claim 1 wherein said first and second pump means are driven by said prime mover means through first and second gear reduction means.

9. A vehicle drive system as claimed in claim 6 wherein said first and second pump means each drives its respective motor means in a closed hydraulic loop such that said first and second pump means function also as flow dividers within the limit of fluid discharge of said first pump means by said control means.

10. A vehicle drive system as claimed in claim 1 wherein said control means permits said first pump means to operate at said greater fluid discharge and causes said second pump means to operate at substantially zero fluid discharge in a second vehicle operating condition.

11. A vehicle drive system as claimed in claim 1 wherein in said first operating condition said first and second pump means function also as flow dividers.

12. A vehicle drive system as claimed in claim 5 wherein each traction means comprises a pair of transversely spaced wheels, one of which pairs is dirigible, and steering control means in each closed loop operable to effect differential wheel speed under traction as between each said pair of wheels which is proportional to the steering angle of the dirigible wheels.

13. A vehicle drive system as claimed in claim 12 wherein said steering control means comprises adjustable flow divider means in each closed loop, both said flow divider means being adjusted responsive to the steering angle of the dirigible wheels.

14. A vehicle drive system as claimed in claim 10 wherein said first operating condition comprises driving said first and second motor means and said operating condition comprises driving said first only of said motor means.

15. A vehicle drive system as claimed in claim 11 wherein each of said first and second pump means operates its respective motor means in a closed hydraulic loop, whereby to maintain nonslip traction drive at each traction means irrespective of variations in tractive conditions at each traction means.

16. In a hydrostatic drive system for a vehicle having prime mover means, first and second traction means, and first and second hydraulic motor means for driving respective ones of said traction means, first and second variable displacement hydraulic pump means driven by the prime mover means for driving respective ones of the hydraulic motors, said first pump means having a fluid discharge capability greater than that of said second pump means, and control means operatively connected to said first and second pump means for operating said second pump means at substantially zero fluid discharge and permitting said first pump means to operate at said greater fluid discharge under a certain vehicle operating condition.

17. A vehicle drive system as claimed in claim 16 wherein valve means operates to communicate in parallel the circuit of said second pump means and second motor means and when said first pump means is operating at said greater fluid discharge.

18. In a hydrostatic drive system for a vehicle having prime mover means, first and second traction means, first and second hydraulic motor means for driving respective ones of said traction means, first and second variable displacement hydraulic pump means driven by the prime mover means for driving respective ones of the hydraulic motors, said first pump means having a pumping capacity greater than that of said second pump means, a first control means connected to both said first and second pump means for maintaining substantially equal the discharge volumes thereof during operation within the pumping capacity of said second pump means, and a second control means enabling said first pump means to be operated at a capacity greater than the capacity of said second pump means.

19. A vehicle drive system as claimed in claim 18 wherein said second control means is operatively connected to said first control means and to said second pump means for thus enabling said first pump means while controlling said second pump means to operate at substantially zero discharge volume.

20. A vehicle drive system as claimed in claim 19 wherein said second control means overrides said first control means to maintain said second pump means at substantially zero discharge volume whenever said first control means operates said first pump means at a capacity greater than the capacity of said second pump means.

21. A vehicle drive system as claimed in claim 18 wherein a third control means controls the prime mover means independently of said first and second control means.

22. A vehicle drive system as claimed in claim 18 wherein said first and second control means include a mechanical element which functions as a rigid link to synchronize the displacements of said first and second pump means during operation within the capacity of said second pump means and which functions as a nonrigid link during operation at said greater capacity.

23. A vehicle drive system as claimed in claim 18 wherein the available control movement of said first control means is limited during operation within the capacity of said second pump means.

24. A vehicle drive system as claimed in claim 18 wherein both said first and second control means are operator actuated, said second control means cooperating with said first control means to limit the available control movement of said first control means during operation within the capacity limit of said second pump means and to impose no limit on the available control movement of said first control means during operation within the capacity limit of said first pump means.

25. A vehicle drive system as claimed in claim 24 wherein said first and second control means include a mechanical element which functions as a rigid link to synchronize the discharge volumes of said first and second pump means during operation within the capacity limit of said second pump means and which collapses or expands during operation at said greater capacity of the first pump means such that said second control means maintains said second pump means at substantially zero fluid discharge while said first control means may increase the capacity of said first pump means greater than the capacity of said second pump means during collapse or expansion of said mechanical element.

26. A hydrostatic transmission system for a vehicle having first and second pairs of selectively drivable wheels comprising hydraulic fluid drive means, first and second pairs of selectively drivable hydraulic motor means for driving respective pairs of said wheels and adapted to be driven by said fluid drive means, said fluid drive means comprising first and second variable displacement hydraulic pump means for driving respective pairs of the motor means, said first pump means having a pumping capacity greater than said second pump means, control means operatively connected to said first and second pump means to effect a shift from four to two-wheel driving without interrupting the flow of traction fluid to said first motor means, said control means including transition control means operative to reconnect the circuit of the second pump means to by-pass the second motor means to facilitate smooth vehicle operation during the transition from four to two-wheel drive said control means being also operatively connected to said first and second pump means for equalizing the fluid discharge of each during four-wheel drive up to the discharge capacity of the second pump means and for operating said transition control means in shifting to two-wheel drive while releasing said first pump means to operate at its greater discharge capacity.

27. A hydrostatic transmission system as claimed in claim 26 wherein the first and second pairs of pump means and motor means are reversible for driving the vehicle either in forward or reverse and for rapidly braking the vehicle, and operator control means for controlling the speed, displacement and direction of said pump means at all times during vehicle operation whereby rapid vehicle braking may be effected by a reversal of torque at the motor means.

28. A hydrostatic transmission system as claimed in claim 26 wherein the distribution of hydraulic fluid to the said first and second motor means by said first and second pump means during four-wheel drive is such that the first and second pairs of wheels traverse substantially the same circumferential distance in the same period of time irrespective of variations in surface or road traction as between surface or road engaging elements of any of said wheels.

29. A hydrostatic transmission system as claimed in claim 26 wherein each of said first and second pump means drives its respective pair of motor means in an independent closed hydraulic loop.

30. In a hydrostatic drive system for a vehicle having prime mover means, first and second traction means, and first and second hydraulic motor means for driving respective ones of said traction means, first and second variable displacement hydraulic pump means driven by the prime mover means for driving respective ones of the hydraulic motors, said first pump means having a maximum displacement greater than the maximum displacement of said second pump means, control means connected to both said first and second pump means for maintaining in a first control position substantially equal the displacements thereof during operation within the displacement limit of said second pump means, and said control means in a second control position enabling said first pump means to be operated at a displacement greater than the maximum displacement of said second pump means.

* * * * *